US012779919B2

(12) United States Patent
Cavanaugh et al.

(10) Patent No.: US 12,779,919 B2
(45) Date of Patent: Nov. 3, 2026

(54) HITCH SENSOR ASSEMBLY

(71) Applicant: Winnebago Industries, Inc., Eden Prairie, MN (US)

(72) Inventors: William Cavanaugh, Nashotah, WI (US); Ullekh Gambhira, Eden Prairie, MN (US)

(73) Assignee: Winnebago Industries, Inc., Eden Prairie, MN (US)

( * ) Notice: Subject to any disclaimer, the term of this patent is extended or adjusted under 35 U.S.C. 154(b) by 0 days.

(21) Appl. No.: 19/060,175

(22) Filed: Feb. 21, 2025

(65) Prior Publication Data

US 2025/0282191 A1 Sep. 11, 2025

Related U.S. Application Data

(60) Provisional application No. 63/563,532, filed on Mar. 11, 2024.

(51) Int. Cl.
*G08B 21/00* (2006.01)
*B60D 1/36* (2006.01)
*B60D 1/62* (2006.01)

(52) U.S. Cl.
CPC ................ *B60D 1/36* (2013.01); *B60D 1/62* (2013.01)

(58) Field of Classification Search
CPC ............... B60D 1/36; B60D 1/62; B60D 1/06
See application file for complete search history.

(56) References Cited

U.S. PATENT DOCUMENTS

| | | | | |
|---|---|---|---|---|
| 7,195,267 | B1 * | 3/2007 | Thompson | B60R 1/003 340/901 |
| 7,568,716 | B2 * | 8/2009 | Dietz | B60D 1/36 348/148 |
| 9,120,358 | B2 * | 9/2015 | Motts | B60D 1/06 |
| 11,040,587 | B2 * | 6/2021 | Nixon | B60D 1/06 |
| 11,511,669 | B1 * | 11/2022 | Kroeze | G06T 7/73 |
| 2007/0216136 | A1 * | 9/2007 | Dietz | B60D 1/62 280/477 |
| 2015/0069736 | A1 * | 3/2015 | Trevino | H04N 7/18 348/118 |
| 2019/0340787 | A1 * | 11/2019 | Ramirez Llanos | G05D 1/0251 |

* cited by examiner

*Primary Examiner* — Toan N Pham
(74) *Attorney, Agent, or Firm* — Faegre Drinker Biddle & Reath LLP

(57) ABSTRACT

A system includes a coupler with a cavity for receiving a coupling member. The system further includes an image sensor coupled to the coupler. The image sensor is configured and positioned to take images of a pattern on the coupling member. The images can be used to estimate a relative orientation of the coupler and the coupling member.

20 Claims, 7 Drawing Sheets

HITCH SENSOR ASSEMBLY

CROSS REFERENCE TO RELATED APPLICATION

This application claims priority to Provisional Application No. 63/563,532, filed Mar. 11, 2024, all of which are herein incorporated by reference in their entirety.

SUMMARY

A system includes a coupler with a cavity for receiving a coupling member. The system further includes an image sensor coupled to the coupler. The image sensor is configured and positioned to take images of a pattern on the coupling member. The images can be used to estimate a relative orientation of the coupler and the coupling member.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1A:
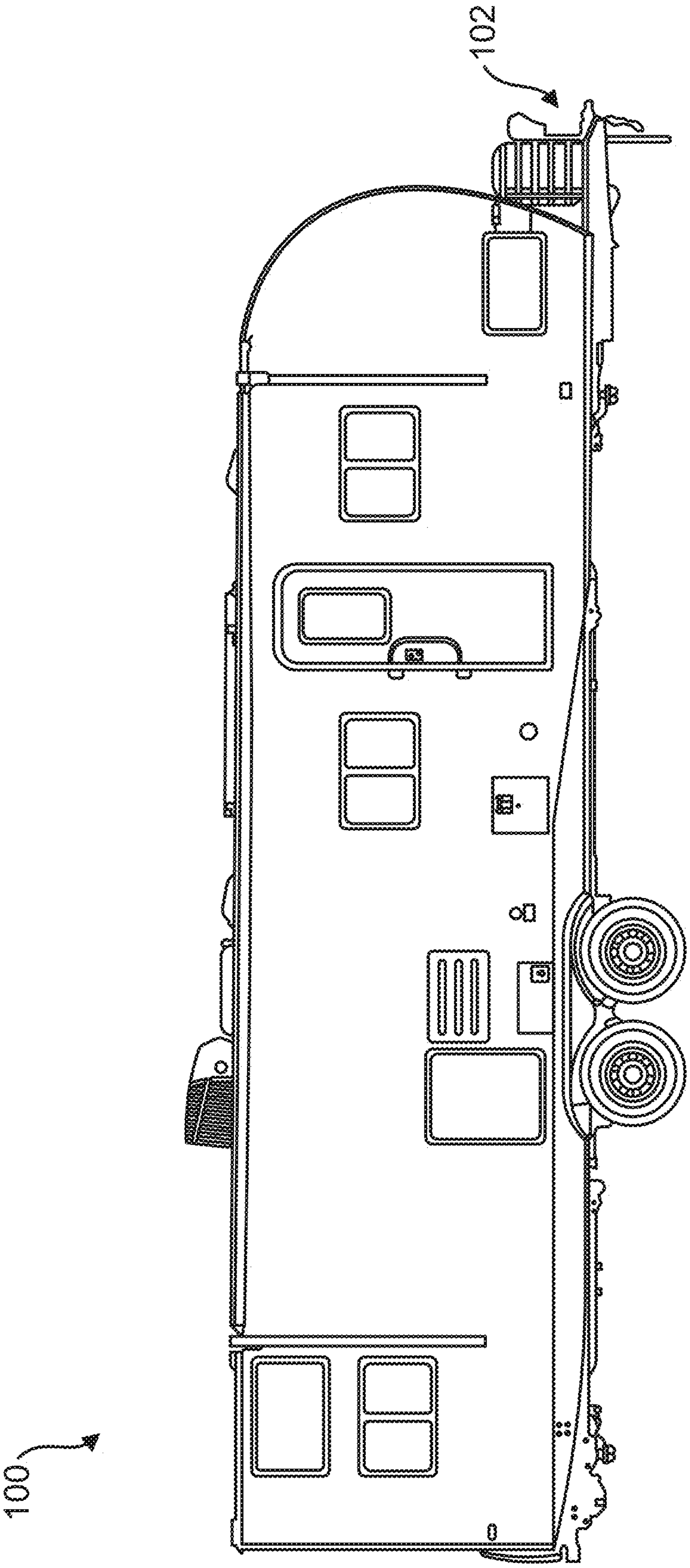
FIG. 1A shows a recreational vehicle, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to a hitch sensor assembly; particular embodiments are directed to a hitch sensor assembly for a trailer such as a recreational vehicle trailer, boat trailer, and the like.

A vehicle (e.g., a truck, a sport utility vehicle, and the like) can be configured to tow a second vehicle (e.g., a trailer) by a hitch assembly. During travel, variables such as vehicle turns, terrain changes, and/or wind can cause the trailer to move with respect to the truck. Such movement can include changes in a roll angle, pitch angle, and/or yaw angle between the truck and the trailer. This movement can impede a driver's ability to maintain control of the truck and/or trailer; thus, it can cause challenging driving conditions. Additionally, an ability to implement corrective action (e.g., activating regenerative braking in the trailer, applying disc brakes, applying drum brakes, activating one or more electric motors) to stabilize movement of the truck and/or trailer can be limited due to a lack of information about the dynamic orientation of the trailer relative to the truck.

To address these and other challenges, certain embodiments of the present disclosure include a sensor assembly that can be used to determine a dynamic orientation of a towed vehicle relative to a towing vehicle. In particular, embodiments of the present disclosure can use outputs of a sensor assembly to determine orientation information, such as measurements that can be used to estimate roll angles, pitch angles, and/or yaw angles of a coupling member assembled with a coupler in a hitch assembly. Based on the orientation information of the coupling member relative to the coupler, the dynamic orientation of the towed vehicle relative to the towing vehicle can be estimated. Accordingly, embodiments of the present disclosure can facilitate application of corrective action to stabilize movement of a towed vehicle and/or a towing vehicle. Thus, embodiments of the present disclosure can improve driving conditions for towed vehicles and increase driving safety.

Towed Vehicles

Although the description below features different types of recreational vehicles as the towed vehicle, embodiments of the present disclosure can be incorporated with different types of towed vehicles such as boat trailers and the like.

Travel Trailers

FIG. 1A shows a towable recreational vehicle such as a travel trailer 100 (hereinafter "trailer 100" for brevity), which is designed to be mechanically coupled to a towing vehicle (e.g., car, truck, sport utility vehicle). The trailer 100 includes a body that houses a living area, and the body is supported by a chassis that includes one or more axles. The trailer 100 also includes a hitch area 102 positioned at a front end of the trailer 100 for removably attaching a coupler (e.g., a cuplike structure having a cavity) to a corresponding coupling member (e.g., a ball) of the towing vehicle such that the towing vehicle can tow or pull the trailer 100.

Figure 1B:
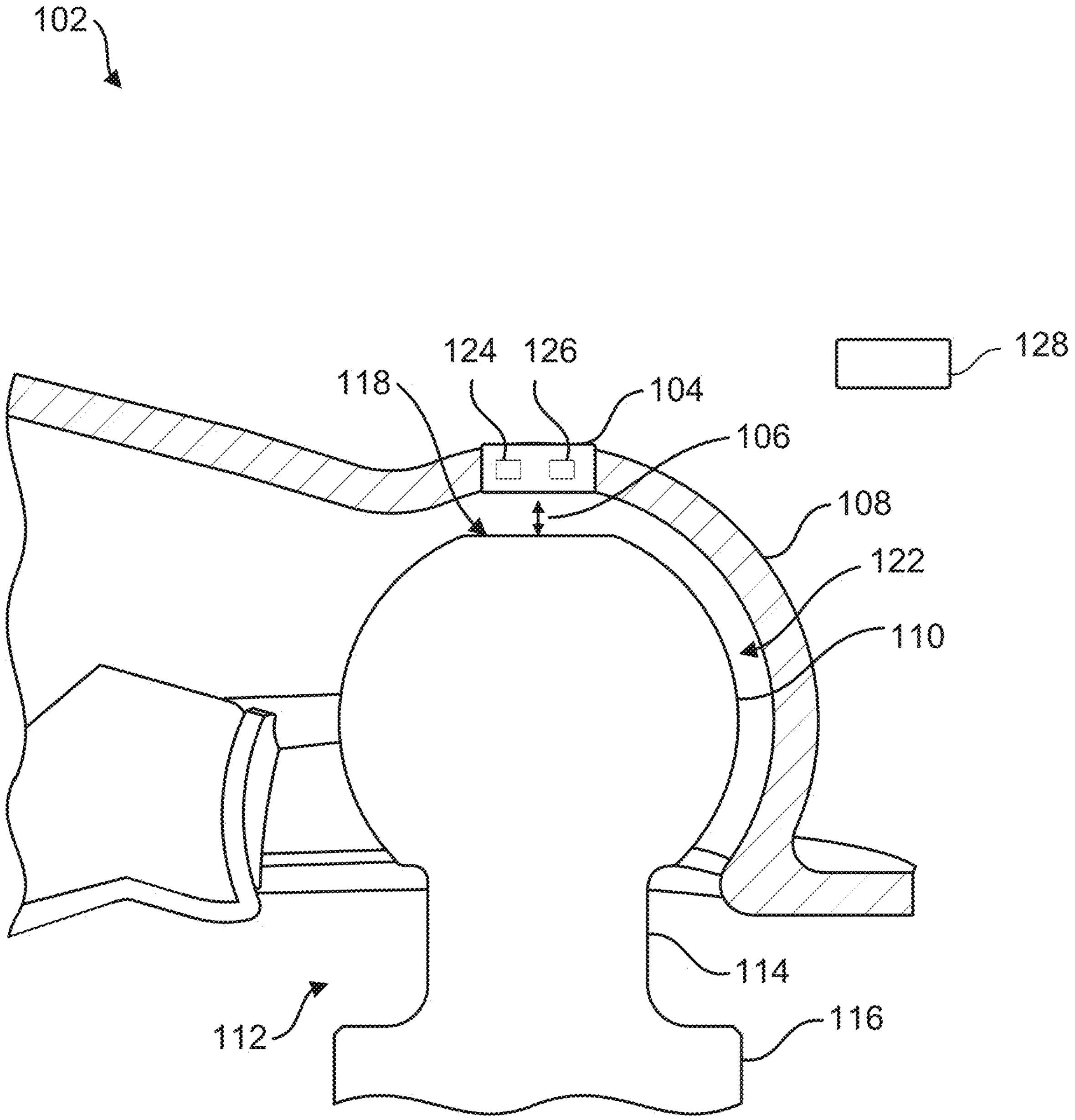
FIG. 1B shows a side view of a hitch area of the recreational vehicle of FIG. 1A, in accordance with certain embodiments of the present disclosure.

FIG. 1B shows a side view of a hitch sensor assembly of the recreational vehicle of FIG. 1A, in accordance with certain embodiments of the present disclosure. In FIG. 1B, the hitch area 102 is shown having a coupler 108 assembled with a coupling member 112 (e.g., a towing ball). Coupling member 112 includes an upper portion 110 (e.g., a ball portion), a shaft portion 114, and a base portion 116 configured to attach to a towing vehicle (e.g., by one or more fasteners; by having a threaded portion). The upper portion 110 of the coupling member 112 is disposed within the cavity 122 of the coupler 108. The coupler 108 can be removably coupled to the coupling member 112 by a locking component (e.g., a ball locking mechanism), forming a hitch sensor assembly for towing the trailer 100.

The coupler 108 includes a sensing device 104 (e.g., an optical sensor, a magnetic sensor) configured to detect a surface 118 of the coupling member 112. As shown in FIG. 1B, the surface 118 can be a flat surface defined at the top of the coupler 108. Alternatively, the surface 118 can be a concave surface. In some embodiments, the sensing device 104 includes an image sensor such as a camera 124 configured to capture images of the surface 118. The camera 124 can include one or more image sensors such as solid-state optical image sensors like a charge-coupled device (CCD) or a complementary metal oxide semiconductor (CMOS) image sensor. In some embodiments, the sensing device 104 includes a light source 126 such as a light-emitting diode configured to illuminate a surface of the coupling member 112 to facilitate image capture by the sensing device 104. The camera 124 and the light source 126 can be part of a single chip package that is coupled to a printed circuit board or flexible circuit coupled to the coupler 108. The printed circuit board (or flexible circuit) and chip package can be housed in a protective housing that is coupled to (e.g., via threads) to the coupler 108.

The hitch sensor assembly of FIG. 1B includes a gap 106 between the sensing device 104 and the surface 118 of the coupling member 112. This configuration can reduce contact and/or wear between the coupling member 112 and the sensing device 104; thus, it can improve the durability of the hitch sensor assembly and/or improve the accuracy of the captured images.

In some embodiments, the sensing device 104 includes a controller that is programmed to compare captured images and calculate a displacement of features of a surface (e.g., the surface 118) included in the images. In other embodiments, the sensing device 104 is communicatively coupled to (e.g., wired, wirelessly) a controller 128 and transmits outputs of the sensing device (e.g., images, magnetic sensing signals) to the controller 128. The controller 128 then uses the images to calculate changes between the images which can be used to determine displacement angles between the coupler 108 and coupling member 112. In certain embodiments, the controller 128 is part of the trailer 100.

The controller 128 (whether part of the sensing device 104 or a separate device) can further be programmed to convert the calculated displacement to pitch angles, roll angles, and yaw angles of the trailer 100 relative to a towing vehicle. In an example, the controller 128 can compare a first image of the surface 118 captured at a first time to a second image of the surface 118 captured at a second time, subsequent to the first time. Based on the comparison, the controller 128 can calculate a displacement of one or more features of the second image relative to the first image to determine a changed orientation of the one or more features between the first time and the second time. The changed orientation can indicate relative pitch angles, yaw angles, and roll angles between the coupler 108 and the coupling member 112 that correspond to relative pitch, yaw, and roll angles between the towing vehicle and the trailer 100. Accordingly, based on the calculated displacement, the controller 128 can determine pitch angles, yaw angles, and/or roll angles of the trailer 100 relative to the towing vehicle. In certain embodiments, the sensing device 104 (e.g., via a sensor such as an image sensor or a magnetic sensor) can be used to determine whether the trailer 100 is positioned relative to the towing vehicle at a towed or towable position. Put another way, the sensing device 104 can determine whether the towing ball 112 is positioned within a cavity of the coupler 108.

In some embodiments, the sensing device 104 is mounted to an existing coupler. For example, the sensing device 104 can be attached within a hole cut into the coupler 108. More specifically, the sensing device 104 and the coupler 108 can corresponding threaded portions such that the sensing device 104 can be connected and held in place by threads. In this way, the hitch sensor assembly can be formed by retrofitting an existing coupler and/or coupling member, as discussed further below.

Figure 1C:
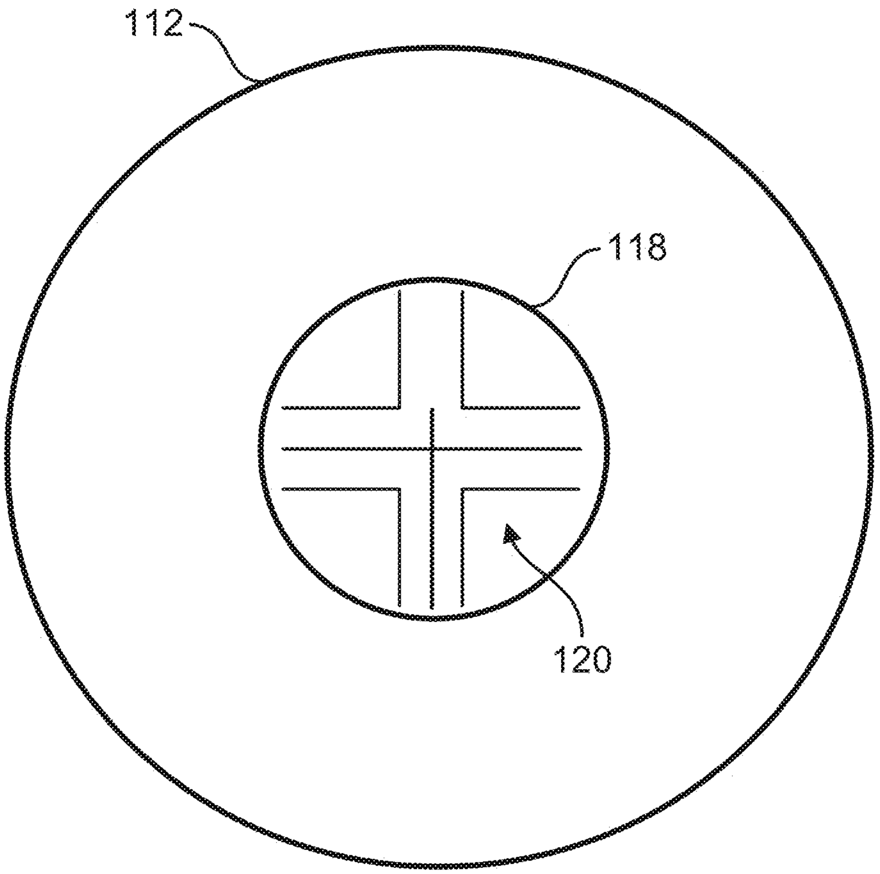
FIG. 1C shows a top view of one example of the coupling member of FIG. 1B, in accordance with certain embodiments of the present disclosure.

FIG. 1C shows a top view the coupling member 112 of FIG. 1B, in accordance with certain embodiments of the present disclosure. The surface 118 of the coupling member 112 includes indicia 120. Indicia 120 can include one or more visual features when using a camera-based sensing device 104 and/or magnetic features when using a magnetic sensor-based sending device 104. The indicia 120 can include marks, images, and/or etched features (e.g., lines, shapes, colors, patterns, and/or alphanumeric characters) that can be detected by the sensing device 104. The indicia 120 can create an asymmetrical pattern (e.g., an asymmetrical cross pattern). In some embodiments, the indicia 120 can facilitate improved accuracy by permitting a consistent set of features to be captured in images by the sensing device 104. Accordingly, in these embodiments, relatively small displacements of the indicia 120 can be accurately detected by the sensing device 104 to determine pitch, yaw, and/or roll angles of the trailer 100 relative to the towing vehicle. In certain embodiments, the sensing device 104 and the controller 128 are calibrated by lining up the centers of the towing vehicle with the trailer.

In some embodiments, indicia 120 can be affixed and/or formed on a surface of an existing coupler and/or coupling member. In this way, the hitch sensor assembly can be formed by retrofitting an existing coupler and/or coupling member. In some embodiments, the hitch sensor assembly (or certain parts thereof) can be sold as a kit. The kit may include, for example, the coupling member 112, indicia 120, and the sensing device 104, as well as various items for attaching such components to parts of a recreational vehicle. In other embodiments, components of the hitch sensor assembly can be installed in a recreational vehicle as the vehicle is being assembled together at a factory.

In certain embodiments, the coupling member 112 (and therefore the indicia 120) can have a fixed pre-determined orientation with respect to the towing vehicle. For example, the coupling member 112 (and indicia 120) can be installed to have a fixed pre-determined orientation. This can help with reducing calibration time and effort due to a fixed zero angle orientation (e.g., when the towing vehicle and trailer are lined up straight with respect to each other).

Fifth Wheel Trailers

Figure 2A:
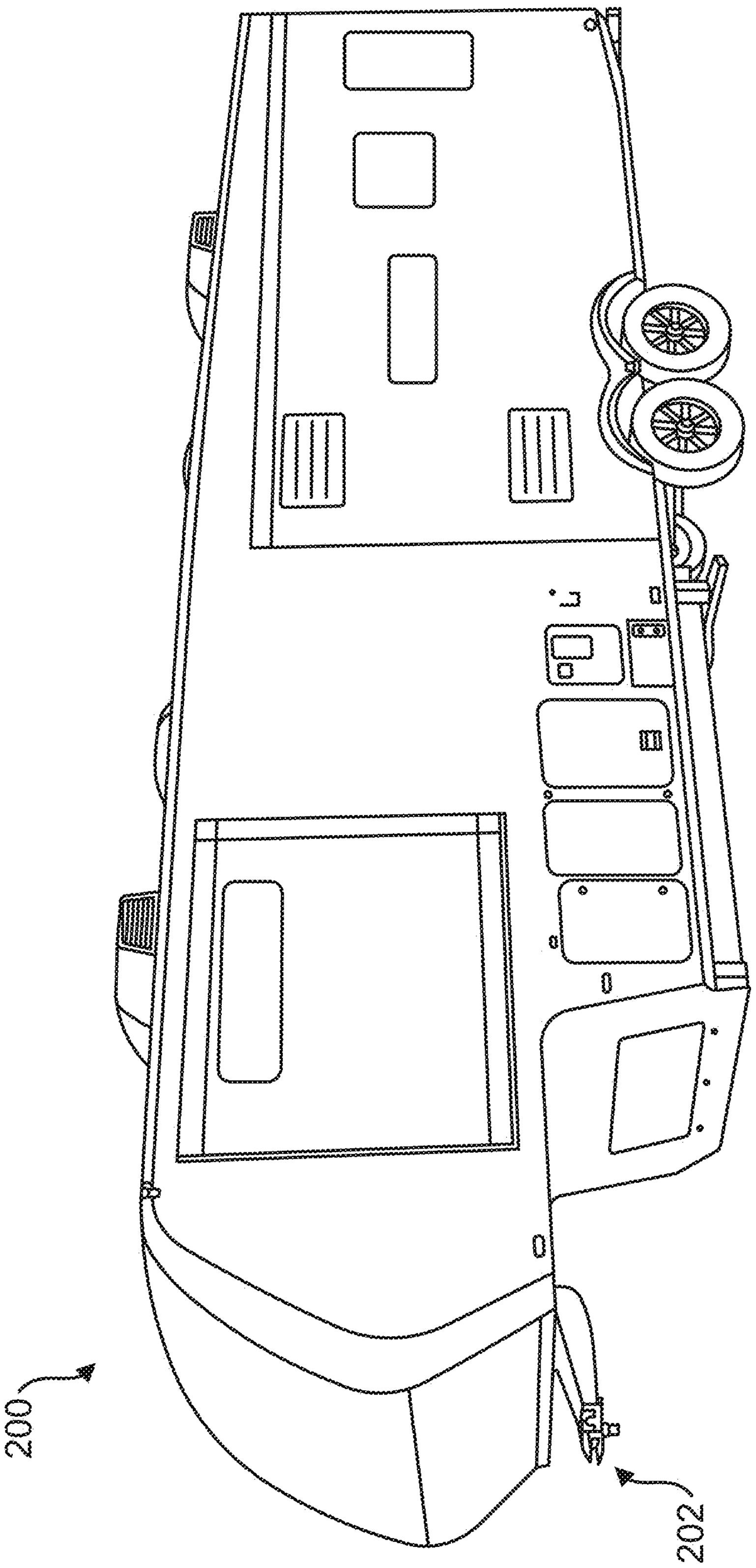
FIG. 2A shows a recreational vehicle, in accordance with certain embodiments of the present disclosure.

FIG. 2A shows a towable recreational vehicle such as a fifth wheel trailer 200 (hereinafter “trailer 200” for brevity), which is designed to be mechanically coupled to a towing vehicle. The trailer 200 includes a body that houses a living area. The trailer 200 can also include a garage at the rear end and accessible by a garage door at the back of the trailer 200. The garage can hold and support vehicles such as an all-terrain vehicle and/or motorcycle.

The trailer 200 also includes a hitch area 202 (e.g., with a fifth wheel pin box) positioned at a front end of the trailer 200 for coupling to a corresponding component (e.g., a pin receptacle) of the towing vehicle such that the towing vehicle can tow or pull the trailer 200.

Figure 2B:
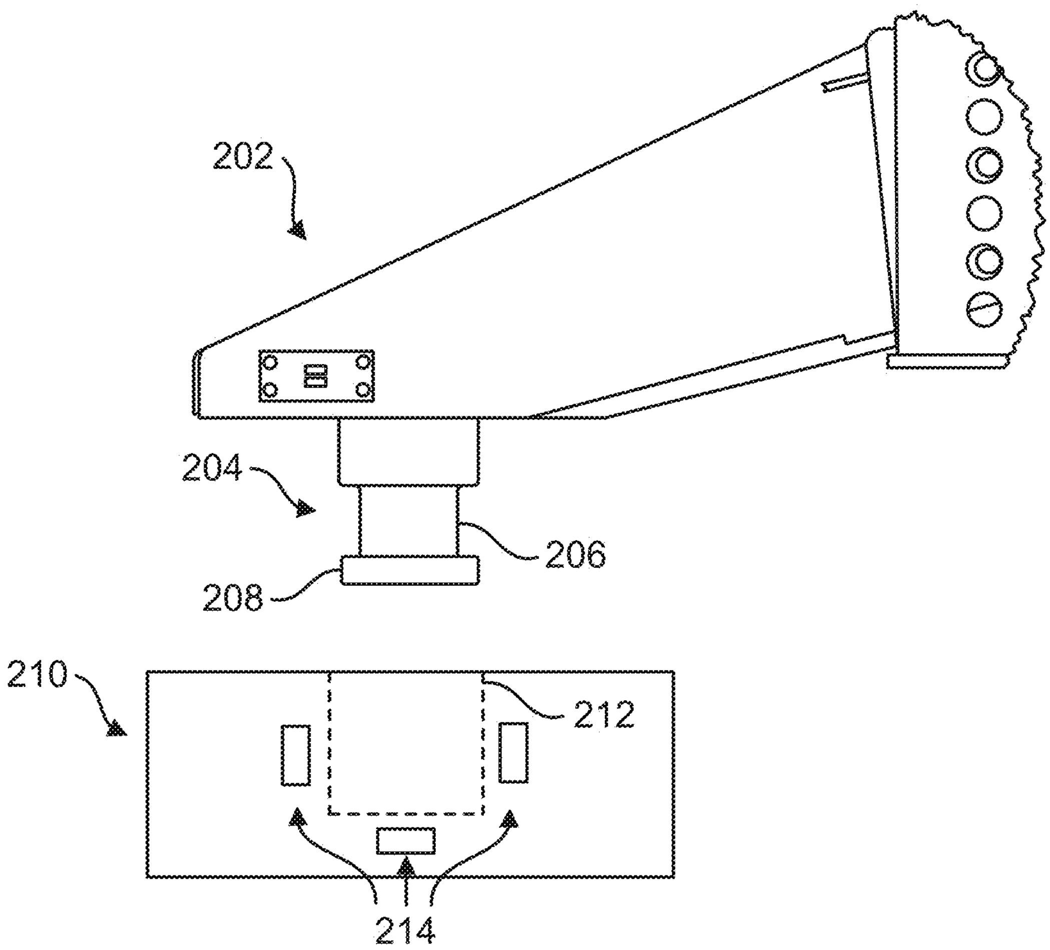
FIG. 2B shows a side view of a hitch area of the recreational vehicle of FIG. 2A, in accordance with certain embodiments of the present disclosure.

FIG. 2B shows a side view of a hitch area 202 of the trailer 200 of FIG. 2A, in accordance with certain embodiments of the present disclosure. Hitch area 202 is shown having a coupling member 204 (e.g., pin) configured to be assembled within a cavity 212 of a coupler 210 (e.g., pin receptacle of a fifth wheel hitch). The coupling member 204 includes a shaft portion 206 and an upper portion 208 to be disposed within the cavity 212 of the coupler 210. The coupling member 204 can be removably fastened to the coupler 210 by a locking component (e.g., a C-shaped lock jaw mechanism) configured to fit around the coupler 210 to secure the coupler 210 and form a hitch sensor assembly for towing the trailer 200. The coupler 210 includes at least one sensing device 214 (e.g., optical sensor, magnetic sensor) configured to detect one or more surfaces of the coupling member 204. The at least one sensing device 214 can be configured to detect one or more surfaces of the coupling member 204 in a manner substantially similar to that described with respect to the sensing device 104 and controller 128 of FIG. 1B.

Some embodiments of the present disclosure can include a plurality of sensing devices and/or sensed surfaces. Such embodiments can provide improved orientation determination. Embodiments of the present disclosure can provide a versatile sensor assembly having relatively few parts that can be used with previously manufactured hitch assembly components (e.g., by retrofitting) as well as hitch assembly components being manufactured in a factory.

Methods

Figure 3:
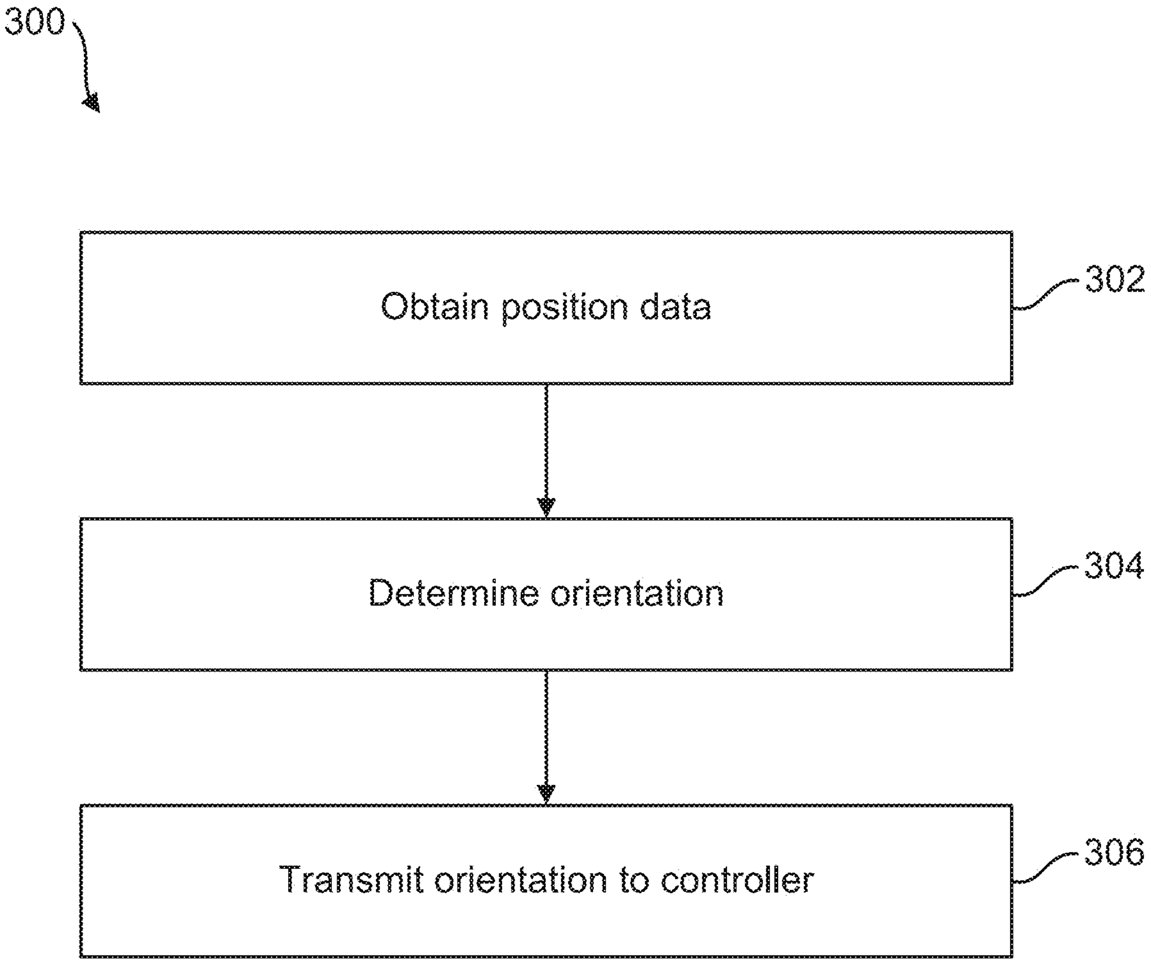
FIG. 3 shows a flowchart of an example method of using a hitch sensor assembly, in accordance with certain embodiments of the present disclosure.

FIG. 3 shows a flowchart of an example method 300 of using a hitch sensor assembly, in accordance with certain embodiments of the present disclosure. Method 300 can be performed by a processor (e.g., a processor such as a microprocessor of sensing device 104, 214 or controller 128).

In operation 302, the processor can obtain position data (e.g., one or more images of a surface of a coupling member or data based on such images). In operation 304, the processor can determine an orientation information (e.g., one or more pitch angles, yaw angles, and/or roll angles) of a trailer relative to a towing vehicle by comparing the position data (captured at different points in time) and calculating displacements corresponding to the position data.

Optionally, in operation 306, the processor can transmit the position data and/or the orientation information to another processor to initiate corrective action. For example, the sensing device can transmit such orientation information by a wired or wireless communication network to a processor (that is part of a controller) of the towing vehicle and/or trailer.

Accordingly, embodiments of the present disclosure can provide information about the dynamic position of the trailer relative to the towing vehicle (e.g., position data and/or orientation information). In some embodiments, such information can initiate corrective action, such as activating in-wheel motors of a trailer as generators (e.g., activating regenerative braking) to reduce trailer sway and stabilize the position of the trailer behind the tow vehicle. Other examples of corrective action include applying disc brakes, applying drum brakes, activating one or more electric motors, etc.

Computing Devices

Figure 4:
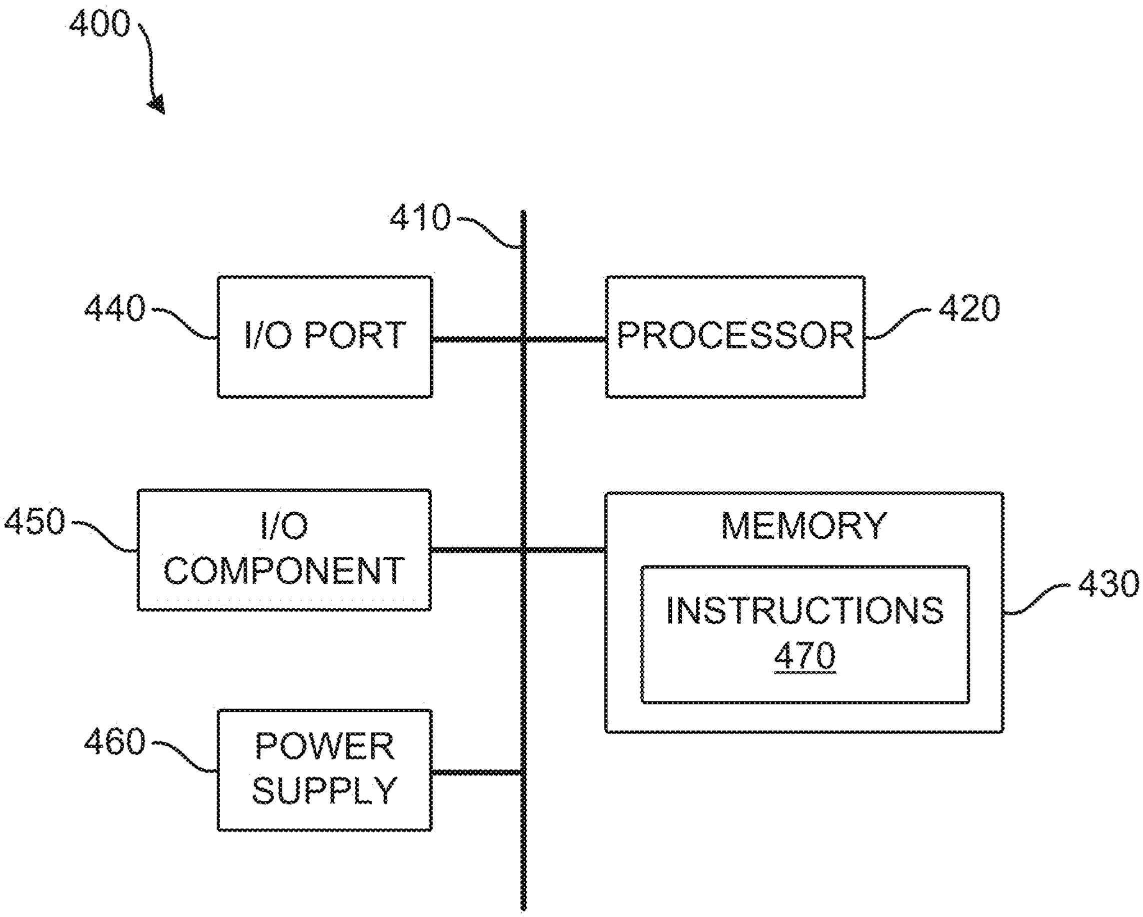
FIG. 4 is a block diagram depicting an illustrative computing device that can be used in accordance with embodiments of the present disclosure.

FIG. 4 is a block diagram depicting an illustrative computing device 400 that can be used in accordance with embodiments of the disclosure. The computing device 400 may include any type of computing device suitable for implementing aspects of embodiments of the disclosed subject matter. Examples of computing devices include specialized computing devices or general-purpose computing devices such as workstations, servers, laptops, desktops, tablet computers, hand-held devices, smartphones, general-purpose graphics processing units (GPGPUs), and the like. Each of the various components shown and described in the Figures can contain their own dedicated set of computing device components, such as those shown in FIG. 4 and described below. For example, the sensing device 104, 214, the controller 128, and the trailer 100, 200 can each include a set of components shown in FIG. 4 and described below.

In embodiments, the computing device 400 includes a bus 410 that, directly and/or indirectly, couples one or more of the following devices: a processor 420, a memory 430, an input/output (I/O) port 440, an I/O component 450, and a power supply 460. Any number of additional components, different components, and/or combinations of components may also be included in the computing device 400.

The bus 410 represents what may be one or more busses (such as, for example, an address bus, data bus, or combination thereof). Similarly, in embodiments, the computing device 400 may include a number of processors 420, a number of memory components 430, a number of I/O ports 440, a number of I/O components 450, and/or a number of power supplies 460. Additionally, any number of these components, or combinations thereof, may be distributed and/or duplicated across a number of computing devices.

In embodiments, the memory 430 includes computer-readable media in the form of volatile and/or nonvolatile memory and may be removable, nonremovable, or a combination thereof. Media examples include random access memory (RAM); read only memory (ROM); electronically erasable programmable read only memory (EEPROM); flash memory; optical or holographic media; magnetic cassettes, magnetic tape, magnetic disk storage or other magnetic storage devices; data transmissions; and/or any other medium that can be used to store information and can be accessed by a computing device. In embodiments, the memory 430 stores computer-executable instructions 470 for causing the processor 420 to implement aspects of embodiments of components discussed herein and/or to perform aspects of embodiments of methods and procedures discussed herein. The memory 430 can comprise a non-transitory computer readable medium storing the computer-executable instructions 470. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-executable instructions 470 may include, for example, computer code, machine-useable instructions, and the like such as, for example, program components capable of being executed by one or more processors 420 (e.g., microprocessors) associated with the computing device 400. Program components may be programmed using any number of different programming environments, including various languages, development kits, frameworks, and/or the like. Some or all of the functionality contemplated herein may also, or alternatively, be implemented in hardware and/or firmware.

According to embodiments, for example, the instructions 470 may be configured to be executed by the processor 420 and, upon execution, to cause the processor 420 to perform certain processes. In certain embodiments, the processor 420, memory 430, and instructions 470 are part of a controller such as an application specific integrated circuit (ASIC), field-programmable gate array (FPGA), and/or the like. Such devices can be used to carry out the functions and steps described herein.

The I/O component 450 may include a presentation component configured to present information to a user such as, for example, a display device, a speaker, and/or the like, and/or an input component such as, for example, a microphone, a joystick, a satellite dish, a wireless device, a keyboard, a pen, a voice input device, a touch input device, a touch-screen device, an interactive display device, a mouse, and/or the like.

The devices and systems described herein can be communicatively coupled via a network, which may include a controller area network (CAN), local area network (LAN), a wide area network (WAN), a cellular data network, via the internet using an internet service provider, and the like.

Aspects of the present disclosure are described with reference to flowchart illustrations and/or block diagrams of methods, devices, systems and computer program products. It will be understood that each block of the flowchart illustrations and/or block diagrams, and combinations of blocks in the flowchart illustrations and/or block diagrams, can be implemented by computer program instructions.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A system comprising:

a trailer;

a coupler connected to the trailer;

an image sensor coupled to the coupler, the image sensor is configured and positioned to take images of a pattern on a coupling member of a towing vehicle; and a controller configured to estimate an orientation based on a comparison of a first image of the pattern taken by the image sensor at a first time and a second image of the pattern taken by the image sensor at a second time that is later than the first time.

2. The system of claim 1, wherein the orientation comprises a roll angle of the coupling member relative to the coupler.

3. The system of claim 1, wherein the orientation comprises a pitch angle of the coupling member relative to the coupler.

4. The system of claim 1, wherein the orientation comprises a yaw angle of the coupling member relative to the coupler.

5. The system of claim 1, further comprising:

the towing vehicle and the coupling member, wherein the pattern is on a surface of the coupling member.

6. The system of claim 5, wherein the coupling member comprises a towing ball.

7. The system of claim 6, wherein the towing ball has a flat portion, wherein the pattern is on the flat portion.

8. The system of claim 1, wherein the image sensor is a camera, the system further comprising a light source positioned and configured to generate light towards the pattern.

9. The system of claim 1, wherein the pattern is an asymmetric pattern.

10. The system of claim 1, wherein the controller is configured to estimate the orientation while the coupling member is positioned within the coupler.

11. A sensor assembly kit having component parts capable of being assembled to be removably attached to each other and/or to a vehicle, the sensor assembly kit comprising the combination of:

a towing ball comprising a flat portion and a pattern positioned on the flat portion, the towing ball configured to be disposed within a cavity of a coupler;

a sensing device configured to detect the pattern; and a controller configured to detect an orientation change of the towing ball relative to the coupler based on the pattern.

12. The sensor assembly kit of claim 11, wherein the sensing device includes a camera and a light source.

13. The sensor assembly kit of claim 11, wherein the orientation change is a yaw angle of the towing ball relative to the coupler.

14. The sensor assembly kit of claim 11, wherein the orientation change is a roll angle of the towing ball relative to the coupler.

15. The sensor assembly kit of claim 11, wherein the orientation change is a pitch angle of the towing ball relative to the coupler.

16. The sensor assembly kit of claim 11, wherein the pattern is an asymmetric pattern.

17. The sensor assembly kit of claim 11, wherein the controller is configured to estimate the orientation change of the trailer relative to the towing vehicle while the towing ball is positioned within the coupler, wherein the estimate is based on a comparison at different points in time.

18. The sensor assembly kit of claim 11, wherein the controller is configured to estimate the orientation change of the trailer relative to the towing vehicle while the towing ball is positioned within the coupler.

19. A system comprising:

a towing vehicle including a hitch;

a trailer coupled to the towing vehicle;

a towing ball connected to the trailer and including a pattern, wherein the towing ball is positioned within the hitch; and an image sensor coupled to the coupler, the image sensor is configured and positioned to take images of the pattern while the towing ball is positioned within the hitch.

20. The system of claim 19, further comprising: a controller configured to estimate an orientation of the trailer relative to the towing vehicle while the towing ball is positioned within the hitch, wherein the estimate is based on a comparison of a first image of the pattern taken by the image sensor at a first time and a second image of the pattern taken by the image sensor at a second time that is later than the first time.

* * * * *